United States Patent [19]

Parker

[11] Patent Number: 5,820,505

[45] Date of Patent: Oct. 13, 1998

[54] VARIABLE RATIO TRANSMISSION

[76] Inventor: Douglas F. Parker, 2627 FM 367 E., Iowa Park, Tex. 76367

[21] Appl. No.: 878,339

[22] Filed: Jun. 18, 1997

[51] Int. Cl.[6] .................................................. F16H 47/04
[52] U.S. Cl. ........................... 475/72; 475/80; 475/82
[58] Field of Search ................................ 475/1, 9, 72, 80, 475/82

[56] References Cited

U.S. PATENT DOCUMENTS

| | | | |
|---|---|---|---|
| 2,628,509 | 2/1953 | Piqué. | |
| 2,832,234 | 4/1958 | Sinclair. | |
| 3,260,133 | 7/1966 | Mattson | 475/9 |
| 3,905,251 | 9/1975 | Greene | 475/72 |
| 4,815,334 | 3/1989 | Lexen | 475/1 |
| 4,834,319 | 5/1989 | Ewy et al. | 475/9 |
| 4,862,767 | 9/1989 | Hauser. | |
| 4,970,914 | 11/1990 | Takagi | 475/32 |
| 5,090,949 | 2/1992 | Thoma et al. | 475/83 |
| 5,125,291 | 6/1992 | Makita et al. | 74/730.1 |
| 5,193,416 | 3/1993 | Kanayama | 475/72 |
| 5,230,519 | 7/1993 | Nishimura et al. | 475/83 |
| 5,289,738 | 3/1994 | Szulczewski | 74/606 R |
| 5,438,831 | 8/1995 | Okada | 60/445 |
| 5,542,307 | 8/1996 | Hasegawa et al. | 74/15.63 |
| 5,584,214 | 12/1996 | Hayashi et al. | 74/732.1 |
| 5,584,772 | 12/1996 | Hayd | 475/72 |

Primary Examiner—Charles A. Marmor
Assistant Examiner—Sherry Lynn Estremsky
Attorney, Agent, or Firm—Brinks Hofer Gilson & Lione

[57] ABSTRACT

A variable ratio transmission includes a differential gear assembly coupled to three separate shafts. One of the shafts is coupled to a prime mover and operates as an input shaft to the differential gear assembly. Another of the shafts is connected to a load and operates as an output shaft of the differential gear assembly. The third shaft is coupled to a controlled load that is controlled by the user to adjust the transmission ratio between the input shaft and the output shaft in a continuous manner.

16 Claims, 2 Drawing Sheets

VARIABLE RATIO TRANSMISSION

BACKGROUND OF THE INVENTION

This invention relates to a variable ratio transmission, such as a transmission that provides a continuously variable ratio between the speeds of input and output shafts, for example.

A need presently exists for a continuously variable ratio transmission that is easily adjustable, low in cost and high in operating efficiency. Various prior art transmissions have been proposed, as described for example in the following U.S. Pat. No. 4,970,914, 5,090,949, 5,125,291, and 5,230,519. However, none of these patents describes the transmission set out below.

SUMMARY OF THE INVENTION

The present invention is defined by the following claims. Without intending to limit these claims in any way, the variable ratio transmission described in detail below combines a differential gear assembly with a hydrostatic coupling. An input shaft supplies power to the differential gear assembly, which is coupled by means of an output shaft to a load to be driven. The hydrostatic coupling is varied in order to select the output speed of the output shaft and the effective ratio of the transmission.

DETAILED DESCRIPTION OF THE PRESENTLY PREFERRED EMBODIMENTS

Figure 1:
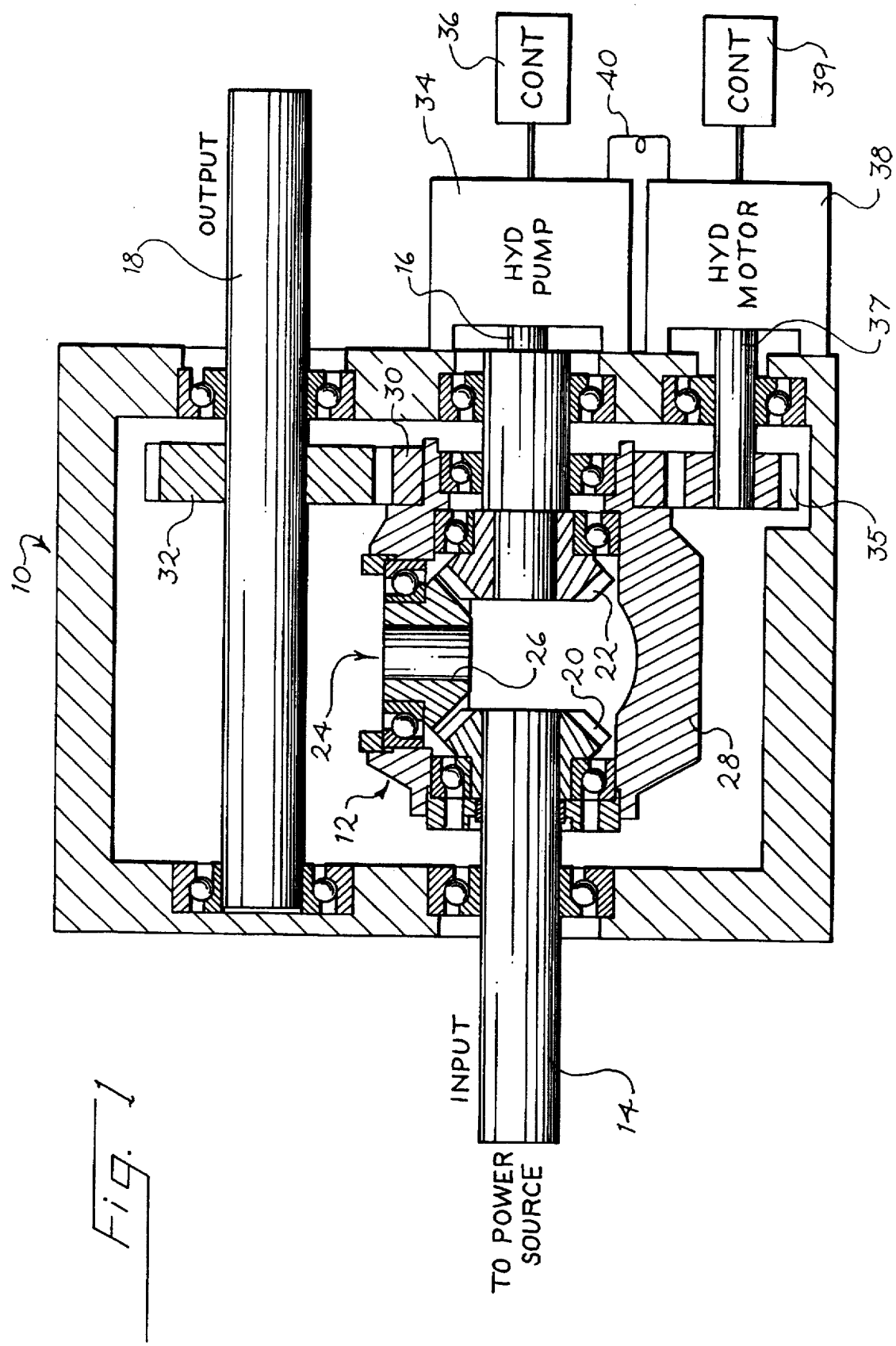
FIG. 1 is a cross-sectional view of a variable ratio transmission that incorporates the preferred embodiment of this invention.

Turning now to the drawings, FIG. 1 shows a continuously variable ratio transmission 10 that includes a differential gear assembly 12 contained within a transmission case. An input shaft 14 supplies power to the transmission 10, and is adapted for connection to a power source, such as an electric motor or an internal combustion engine for example. The transmission 10 also includes a pump shaft 16 which is connected to a hydraulic pump 34 which forms a hydrostatic coupling with a hydraulic motor 38 as described below. An output shaft 18 is adapted for connection to the mechanism being driven by the transmission 10. The input shaft 14 and the pump shaft 16 can be considered axle shafts.

The differential gear assembly 12 includes a first bevel gear 20 that is connected to rotate in unison with the input shaft 14 and a second bevel gear 22 that is connected to rotate in unison with the pump shaft 16. The bevel gears 20, 22 are in constant meshing engagement with a carrier gear 26 that is carried in a rotatable frame 28 included in a carrier gear assembly 24. The frame 28 is mounted for rotation about an axis that passes through the centerlines of the input and pump shafts 14, 16. An outer portion of the frame 28 supports a spur gear 30 that is in constant meshing engagement with a spur gear 32 mounted for rotation in unison with the output shaft 18.

The spur gear 30 is also in constant mesh with a spur gear 35, which is mounted on a shaft 37 and is driven by the hydraulic motor 38. The swashplate angle (and therefore the displacement) of the pump 34 is controlled by a controller 36, and pressurized hydraulic fluid from the pump 34 is conducted to the hydraulic motor 38 via a line 40. A controller 39 controls the swashplate angle and therefore the displacement of the variable volume hydraulic motor 38.

For a desired torque to be applied to bevel gear 26, an equivalent torque must be applied by the load controller 36 the bevel gear 22 via shaft 16 and the variable volume pump 34. This is accomplished by the controller 36 positioning the swashplate of the pump 34. The amount of torque placed on shaft 18 by shaft 14 will include both the mechanically transmitted torque applied by the input on shaft 14 via bevel gear 20, bevel gear 26, spur gear 30, and spur gear 32 as well as the hydraulically transmitted torque applied by the variable hydraulic motor 38 through spur gear 35, spur gear 30, and spur gear 32. In this application, the variable volume hydraulic pump 34 acts as a retarding brake on pump shaft 16, and the energy it develops in hydraulic fluid flows to hydraulic motor 38 to develop torque and energy on output shaft 18.

Until the torque on shaft 14 overcomes the standing load torque on shaft 18, the hydraulic pump 34 must absorb all the energy put into the differential gear assembly 12. Since the carrier gear assembly 24 is stationary, the only way energy can get out of differential gear assembly 28 is through the hydraulic pump 34.

With output shaft 18 stopped, the variable volume motor 38 is stopped with its swashplate set at full deflection by its controller 39. The variable volume pump 34 is turning at the same speed as input shaft 14 with its swashplate at neutral. The slightest deflection of the swashplate in pump 34 will pressurize fluid in line 40. This fluid will cause the motor 38 to overcome the standing load torque on shaft 18 and start the shaft rotating. As soon as shaft 18 begins to rotate, energy will also be transferred from the input shaft 14 to the output shaft 18 via bevel gear 20, bevel gear 26, spur gear 30, and spur gear 32.

Figure 2:
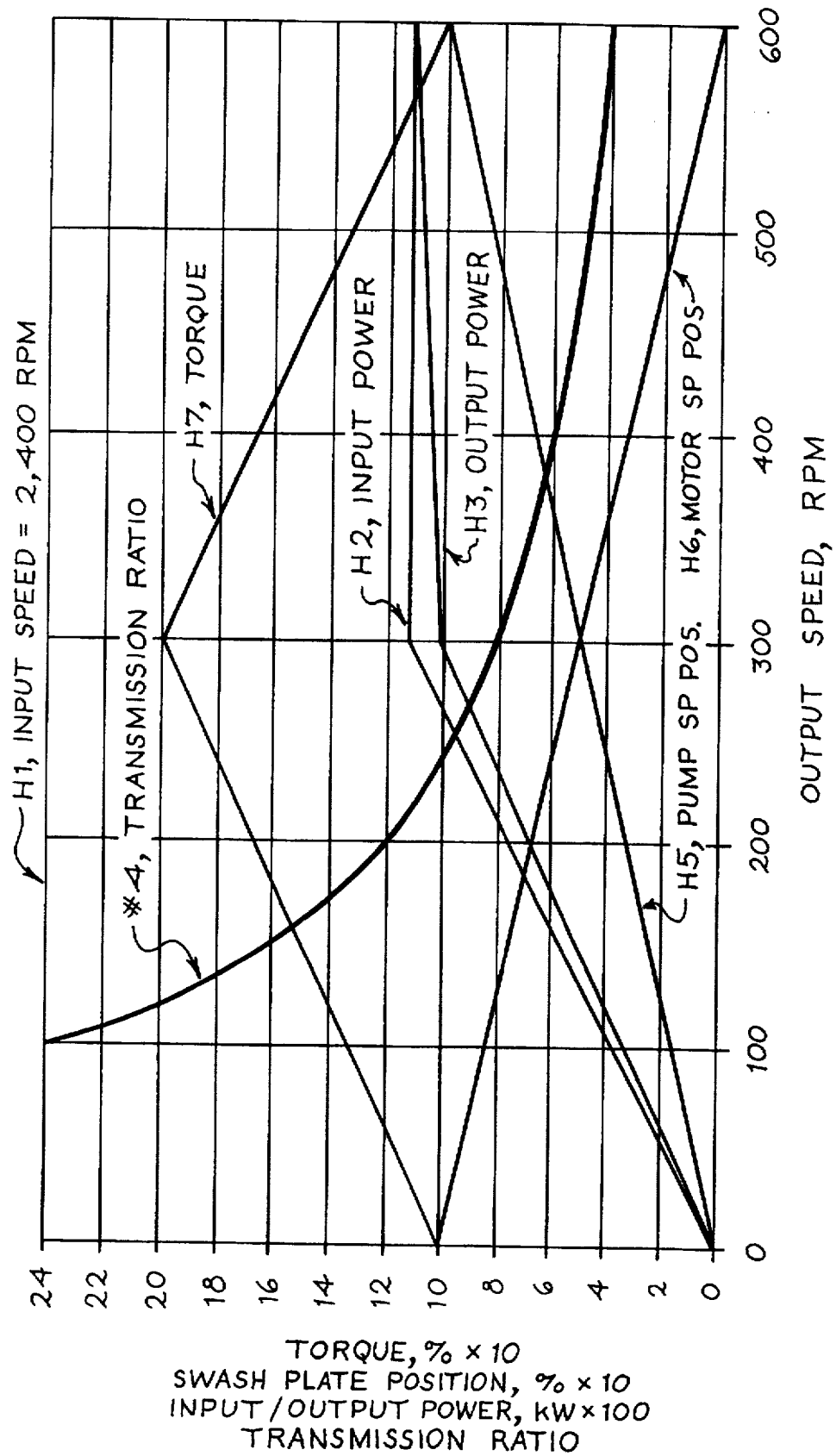
FIG. 2 is a graph illustrating operating parameters of the transmission of FIG. 1.

As shown in FIG. 2, with the output shaft 18 at zero speed, the torque capability of 100% is developed by the hydraulic motor 38 with almost zero torque and zero energy load on the input shaft 14. As the hydraulic motor 38 causes the output shaft 18 to rotate, energy is transmitted via the gearing. This energy causes the input shaft 14 to increase the speed of the output shaft 18 against the standing torque.

When the output shaft 18 is at half speed, the transmission can develop the full energy available at the input shaft 14 if sufficient retarding torque is applied to the output shaft 18. The transmission can therefore transmit all of the energy in the power source driving input shaft 14 if sufficient retarding torque is applied to the output shaft 18. The swashplate angle on the pump 34 will be at least one half open and the swashplate angle on the motor 38 will be at least one half open and equal to the swashplate angle on the pump 34. Half the energy will go through the hydraulics and half the energy will go through the gearing as indicated on FIG. 2. The full torque through the hydraulics will add to the full torque through the gearing giving the transmission the ability to deliver 200% torque at 50% output speed allowing full energy transfer at 50% output speed.

At 50% output speed, if the swashplate on hydraulic motor 38 is moved further toward neutral, the output speed will increase, the torque capability will decrease, and the energy transfer capability will stay constant from 50% to 100% output speed.

At full output speed the swashplate of the hydraulic pump 34 is at full open, the hydraulic motor 38 swashplate is at neutral and stops the hydraulic flow from the pump 34 and the hydraulic pump 34 is hydrostatically locked.

The hydraulic efficiency is expected to be almost 100% at zero output speed, 90% at half output speed, and almost 100% at full output speed. The transmission should have an average efficiency of above 92%.

FIG. 2 provides an example of the expected operation of the transmission 10 of FIG. 1, as applied for example to a modern marine transmission application. In FIG. 2 the output speed of the output shaft 18 is shown on the horizontal axis, and various parameters related to the input power and speed and the gear ratio are shown on the vertical axis. Curve H1 is used to show the input speed, which remains constant at 2,400 rpm. Curve H2 shows the input power, which remains constant above 50% output speed at about 1,127 kilowatts in this application. Curve H3 shows the output power, again in kilowatts. The flat portions of the power curves H2, H3 assume that the load torque is available to absorb the full 1,127 kilowatt input power. Note that the output power remains substantially equal to the input power over a wide range of speeds of the output shaft, thereby showing the high efficiency of the transmission 10. The transmission ratio provided by the transmission 10 is graphed on curve H4. This transmission ratio ranges from an extremely high value at low output speeds to a value of about 4.06 for full output speed (600 rpm). The output reduction ratio of 4.06 is the highest ratio appropriate for this application. The transmission ratio curve H4 clearly demonstrates that a wide range of ratios can be achieved with a single transmission 10. The curves H5 and H6 show the swashplate positions for the pump 34 and the motor 38, respectively, shown as a fraction of the full on position. Curve H7 shows the output torque applied to the output shaft 18.

The curves graphed in FIG. 2 are for the maximum transmission capability of the transmission 10 for 1127 kW input at 2400 rpm to the input shaft 14. If the input speed is raised or lowered all the functions will change in proportion to the speed change. The transmission 10 can operate at any point below the appropriate curve of FIG. 2.

The variable volume pump 34 is selected to accept the full torque applied to the input shaft 14. The variable volume motor 38 can be identical in size to pump 34. If a larger hydraulic motor is selected, the point at which 100% energy can be transmitted will move from 50% speed to a lower speed.

The torque in the system is determined by the load on the output shaft 18. The speed ratio between the input shaft 14 and the output shaft 18 is determined by the relative positions of the swashplates of the pump 34 and the motor 38. The hydraulic pressure in the line 40 between the pump 34 and the motor 38 is determined by the torque on the output shaft 18 when the swashplate on the pump 34 is opened or moved off neutral.

At zero output speed any energy transmission is hydraulic, and at 100% output speed the energy transmission is all mechanical. When the hydraulic pump 34 and hydraulic motor 38 are identical in size, and the transmission is operated at 50% output speed, energy transmission is 50% hydraulic and 50% mechanical through gearing.

Of course, it will be understood that many changes and modifications can be made to the preferred embodiment described above. Other types of braking loads can be substituted for the hydraulic coupling illustrated above, and any suitable type of differential gear assembly can be used. For example, the differential gear assembly can be formed entirely of spur gears instead of the bevel gears shown above. In certain applications, such as small drives, where energy loss may not be considered a significant factor, a tension brake can readily replace the hydraulic coupling.

Any suitable pump, brake or other adjustable source of a retarding torque will be referred to herein as a controlled load. The transmission itself can be scaled as appropriate for a wide range of power and torque levels and a wide range of gear ratio adjustments. Any suitable controller can be used to adjust the controlled load, including microprocessor-based controllers, hydraulic controllers, and various types of governors.

It should be understood that the foregoing detailed description has described only a few of the many forms that the present invention can take. This description is therefore intended as an illustration and not as a definition of the invention. It is only the following claims, including all equivalents, that are intended to define the scope of this invention.

It is claimed:

1. A variable ratio transmission comprising:
   a bevel gear differential comprising first and second bevel gears and a carrier gear assembly, said carrier gear assembly in constant meshing engagement with both the first and second bevel gears;
   an input shaft coupled with the first bevel gear, said input shaft adapted for connection to a power source;
   a variable rate hydraulic pump coupled with the second bevel gear, said pump operative to apply a selectable load to retard rotation of the second bevel gear;
   an output shaft coupled with the carrier gear assembly; and
   a variable rate hydraulic motor powered by the hydraulic pump and coupled with the output shaft to drive the output shaft;
   said transmission characterized by an input shaft/output shaft speed ratio that varies with rotational speed of the second bevel gear.

2. The invention of claim 1 further comprising a controller, coupled to the pump and operative to adjust the rotation-retarding load on the second bevel gear.

3. The invention of claim 1 further comprising a motor controller, coupled to the motor and operative to adjust displacement of the motor, and a pump controller, operative to adjust displacement of the pump.

4. The invention of claim 3 wherein the controllers are operative to vary the rotation-retarding load on the second bevel gear continuously, and wherein the variable ratio transmission provides a continuously variable ratio.

5. The invention of claim 1 wherein the carrier gear assembly comprises a third bevel gear in constant meshing engagement with both the first and second bevel gears.

6. The invention of claim 1 wherein the hydraulic pump is coupled with the second bevel gear with a constant, fixed speed ratio therebetween.

7. The invention of claim 1 wherein the output shaft is coupled with the carrier gear assembly with a constant, fixed speed ratio therebetween.

8. The invention of claim 1 wherein the input shaft is coupled with the first bevel gear with a constant, fixed speed ratio therebetween.

9. The invention of claim 1 wherein the input shaft, the hydraulic pump and the output shaft are coupled with the first bevel gear, the second bevel gear and the carrier gear assembly, respectively, with respective constant, fixed speed ratios therebetween.

10. The invention of claim 9 wherein the speed ratios for the input shaft and the hydraulic pump are both 1:1.

11. The invention of claim 1 wherein the hydraulic motor is coupled with the output shaft with a constant, fixed speed ratio therebetween.

12. A variable ratio transmission comprising:

a bevel gear differential comprising first, second and third shafts, said first and second shafts coupled with respective first and second bevel gears, said third shaft coupled with a gear assembly that comprises a third bevel gear in constant meshing engagement with the first and second bevel gears;

the first shaft coupled with an input shaft adapted for connection to a power source;

the second shaft coupled with a variable rate hydraulic pump operable to apply a selectable load tending to retard rotation of the second shaft;

the third shaft coupled with an output shaft adapted for connection to a load to be driven by the power source; and a variable rate hydraulic motor powered by the hydraulic pump and coupled with the third shaft with a constant, fixed speed ratio therebetween.

13. The invention of claim 12 further comprising a controller, coupled to the hydraulic pump and operative to adjust the rotation-retarding load on the second shaft.

14. The invention of claim 12 wherein the controller is operative to vary the rotation-retarding load on the second shaft continuously, and wherein the variable ratio transmission provides a continuously variable ratio.

15. A variable rate transmission comprising:

a bevel gear differential comprising first and second bevel gears and a carrier gear assembly, said carrier gear assembly comprising a third bevel gear in constant meshing engagement with both the first and second bevel gears;

an input shaft coupled with the first bevel gear with a first constant, fixed speed ratio therebetween, said input shaft adapted for connection to a power source;

a variable rate hydraulic pump coupled with the second bevel gear with a second constant, fixed speed ratio therebetween;

an output shaft coupled with the carrier gear assembly with a third constant, fixed speed ratio therebetween;

a variable rate hydraulic motor powered by the hydraulic pump and coupled with the output shaft with a fourth constant, fixed speed ratio therebetween;

said transmission characterized by an input shaft/output shaft speed ratio that varies with rotational speed of the second bevel gear.

16. The invention of claim 15 wherein the first and second speed ratios are both 1:1.

* * * * *